United States Patent [19]

Hovestadt et al.

[11] Patent Number: 5,453,460
[45] Date of Patent: Sep. 26, 1995

[54] PROCESS FOR REUSING THE OVERSPRAY OBTAINED FROM SPRAYING COATING COMPOSITIONS

[75] Inventors: Wieland Hovestadt, Krefeld; Jochen Brück, Cologne; Harald Blum, Wachtendonk, all of Germany

[73] Assignee: Bayer Aktiengesellschaft, Leverkusen, Germany

[21] Appl. No.: 201,913

[22] Filed: Feb. 25, 1994

[30] Foreign Application Priority Data

Mar. 3, 1993 [DE] Germany .................. 43 06 614.3

[51] Int. Cl.⁶ ............................................. C08K 5/16
[52] U.S. Cl. ............................ 524/591; 521/49; 521/49.5; 528/45; 528/49; 528/67
[58] Field of Search ........................ 524/591; 521/49, 521/49.5; 528/45, 49, 67

[56] References Cited

U.S. PATENT DOCUMENTS

| | | | |
|---|---|---|---|
| 4,220,456 | 9/1980 | Block | 55/85 |
| 4,687,520 | 8/1987 | Seng | 106/271 |
| 5,075,370 | 12/1991 | Kubitza et al. | 524/591 |
| 5,281,629 | 1/1994 | Hovestadt et al. | 521/49 |

FOREIGN PATENT DOCUMENTS

| | | |
|---|---|---|
| 2059420 | 7/1992 | Canada . |
| 2063857 | 10/1992 | Canada . |
| 4138088 | 4/1992 | Germany . |

*Primary Examiner*—Edward Cain
*Attorney, Agent, or Firm*—Joseph C. Gil; Thomas W. Roy

[57] ABSTRACT

The present invention relates to a process for reusing the overspray obtained when spraying water dilutable two-component polyurethane coating compositions containing a polyisocyanate and a compound containing isocyanate reactive groups by (i) collecting the overspray and optionally diluting it with water,
(ii) simultaneously with or after step (i), reacting the overspray, optionally in the presence of emulsifiers, with compounds which are more reactive with isocyanate groups than both water and the compounds containing isocyanate reactive groups and
(iii) reusing the resulting aqueous solution or dispersion of the chemically modified overspray in a one- or two-component, chemically and/or physically drying coating composition, optionally after adjusting the spray viscosity of the coating compositions to a suitable spray viscosity by either removing or adding water and optionally after the addition of additives.

15 Claims, No Drawings

PROCESS FOR REUSING THE OVERSPRAY OBTAINED FROM SPRAYING COATING COMPOSITIONS

BACKGROUND OF THE INVENTION

1. Field of the Invention

The present invention relates to a process for reusing overspray resulting from the spraying of water-dilutable two-component polyurethane coating compositions. The term "overspray" is defined as the components which do not reach the substrate to be coated when the coating composition is sprayed and, therefore, are lost if no special precautions are taken.

2. Description of the Prior Art

Solvent-containing two-component polyurethane lacquers have acquired great practical importance due to their outstanding properties. It has recently become known to combine certain polyhydroxyl acrylates (EP-B-0,358,979) or certain polyhydroxyl polyesters (EP-A-0,496,205) with polyisocyanates which contain free isocyanate groups to produce aqueous two-component systems. These coating compositions have a pot life of several hours and harden to high quality cross-linked films which are comparable in their properties to the lacquer films hitherto obtained from solvent-containing two-component polyurethane coating compositions.

In practice, the lacquers are generally applied to their substrates by spraying. It is not possible to prevent significant quantities of the coating components to be lost by overspray. In practice, these excess quantities are generally washed out of the exhaust air of the coating plant with water and coagulated with the aid of coagulating agents such as surface active, inorganic materials, e.g., clay. Previously, there has been no use for this "lacquer sludge."

Processes by which water dilutable one-component systems can be spray lacquered without producing waste have recently been developed. JOT 3/1992 pages 34–39 proposes discs or bands arranged behind the material to be sprayed. The overspray is then continuously stripped off, collected in containers, readjusted to spray viscosity with water and then reused. A possibility of recovering the overspray of water dilutable, air drying lacquers in a coating plant, including washing with water is described in EP-A-0,508,107. The lacquer, which has been diluted with plant water, undergoes no chemical change and is reconcentrated to the original solids content by ultra-filtration.

According to DE-OS 4,138,088, ultrafiltration is also suitable for reconcentrating the overspray of water dilutable two-component polyurethane systems that have a long pot life if polymerization retarders are added. Since the cross-linking reaction of water dilutable two-component polyurethane systems continues to progress at room temperature, the system which has been worked up is not stable in storage but undergoes continuous change, which would be expected to cause considerable fluctuations in quality.

It is an object of the present invention to develop a process which enables the overspray of aqueous two-component polyurethane systems to be worked up into new storage stable coating compositions before it has become completely unusable due to the gradually progressing cross-linking reaction.

This object may be achieved in accordance with the present invention. It has been found that the overspray of coating compositions, which essentially contain a mixture of a) organic polyisocyanates, b) an aqueous solution or dispersion of organic compounds containing isocyanate reactive groups, preferably organic polyhydroxyl compounds, and c) optionally pigments and/or other lacquer additives, can be used again if the polyisocyanates of the overspray are reacted with compounds which are more highly reactive with isocyanate groups than either the isocyanate reactive compounds or water.

SUMMARY OF THE INVENTION

The present invention relates to a process for reusing the overspray obtained when spraying water dilutable two-component polyurethane coating compositions containing a polyisocyanate and a compound containing isocyanate reactive groups by (i) collecting the overspray and optionally diluting it with water, (ii) simultaneously with or after step (i), reacting the overspray, optionally in the presence of emulsifiers, with compounds which are more reactive with isocyanate groups than both water and the compounds containing isocyanate reactive groups and (iii) reusing the resulting aqueous solution or dispersion of the chemically modified overspray in a one-or two-component, chemically and/or physically drying coating composition, optionally after adjusting the spray viscosity of the coating compositions to a suitable spray viscosity by either removing or adding water and optionally after the addition of additives.

DETAILED DESCRIPTION OF THE INVENTION

In coating plants which have a water washing capability, the compounds, which are more reactive with isocyanate groups, are preferably dissolved or dispersed in the washing water of the plant, optionally with the aid of emulsifiers. The modified coating compositions can be reconcentrated by conventional methods such as ultrafiltration or low pressure evaporation. In plants which use discs or bands as described above, the reaction is preferably carried out in receivers.

The resulting aqueous solution or dispersion of the chemically modified overspray may be reused as a component of a water dilutable two-component polyurethane coating composition, as a water dilutable one-component coating composition which can be cross-linked by heat and as a physically drying one-component composition.

The polyisocyanate component in two-component polyurethane coating compositions preferably contains lacquer polyisocyanates, i.e. derivatives of monomeric diisocyanates containing biuret, isocyanurate, urethane, allophanate and/or uretdione groups. Preferred derivatives are prepared from 1,6-diisocyanato-hexane or mixtures of 1,6-diisocyanato-hexane with 1-isocyanato-3,3,5-trimethyl-5-isocyanatomethylcyclohexane and/or aromatic diisocyanates such as 2,4- and/or 2,6-diisocyanatotoluene, although derivatives of the aromatic diisocyanates are less preferred. These polyisocyanates are described, e.g., in DE-OS 4,137,429 (which corresponds to copending application, U.S. Ser. No. 07/973,368, the disclosure of which is herein incorporated by reference). The polyisocyanates have an average isocyanate functionality of 2.2 to 5.0, a viscosity at 23° C. of 50 to 10,000, preferably 50 to 2000 mPa.s and a monomeric diisocyanate content of less than 0.5% by weight.

The use of hydrophilically modified polyisocyanates is particularly recommended in many cases. It facilitates emulsification of the polyisocyanate in the aqueous phase and in some cases increases the pot life. Such hydrophilically modified polyisocyanates (see e.g. DE-OS 4,137,429) may be obtained by the reaction of di- or polyisocyanates with monofunctional polyethers prepared from ethylene oxide and optionally propylene oxide. They may also be obtained by the incorporation of carboxylate groups by reacting the di- or polyisocyanates with carboxylic acids containing hydroxyl groups, e.g. 2,2-dimethylol-propionic acid or hydroxypivalic acid, and neutralizing the acids groups before or after the reaction.

If necessary, the polyisocyanates may be used as mixtures with small quantities of inert solvents to lower the viscosity to a value within the abovementioned ranges. The quantity of such solvents should, however, be calculated so that the two-component polyurethane coating compositions finally obtained contain at most 20% by weight of solvent, based on the quantity of water.

The isocyanate reactive components of the two-component polyurethane coating compositions include the known, relatively high molecular weight polyhydroxyl compounds having a hydroxyl group content of 0.1 to 10% by weight. They are described, e.g., in DE-OS 4,137,429 (which corresponds to copending application, U.S. Ser. No. 07/973,368, the disclosure of which is herein incorporated by reference), DE-OS 3,829,587 (which corresponds to U.S. Pat. No. 5,075,370, which is herein incorporated by reference) and EP-A-0,496,205 (which corresponds to copending application, U.S. Ser. No. 07/820,172, the disclosure of which is herein incorporated by reference). The water dilutability of these resins is ensured if necessary by the incorporation of ionic groups such as sulphonate and, in particular, carboxylate groups, or by the addition of external emulsifiers. Examples of such resins containing hydroxyl groups include the polyester, polyether, polyacrylate, polyester urethane, polyurethane, polydiene resins and mixtures thereof.

The binders are generally prepared by emulsifying the polyisocyanate component in the aqueous solution or dispersion of the polyhydroxyl component in an amount sufficient to provide an NCO/OH equivalent ratio of 0.2:1 to 5:1, preferably 0.5:1 to 2:1.

In addition to containing the above-mentioned binder components and water which constitutes the continuous phase, the two-component polyurethane coating compositions suitable for this invention may contain known additives such as pigments, fillers, levelling agents, gloss improvers, antisettling agents, thickeners, thixotropic agents, antioxidants, heat stabilizers, defoamants and emulsifiers. The presence of such additives has no influence on the ability to reuse the coating compositions according to the invention because the additives are generally also recovered and reused if they are present in the overspray, which is used a starting material in accordance with the present invention.

The compounds containing isocyanate reactive groups used in process step (ii) are preferably compounds which are monofunctional in the isocyanate addition reaction and are more reactive with isocyanate groups with both water and the compounds containing isocyanate reactive groups present in the two-component polyurethane coating compositions, in particular the above-mentioned polyhydroxyl compounds. Suitable compounds for this purpose include primary and secondary monoamines containing aliphatically bound amino groups and having 1 to 36, preferably 1 to 19 carbon atoms, such as methylamine, ethylamine, n-butylamine, isobutylamine, n-pentylamine, n-hexylamine, n-stearylamine, dimethylamine, diethylamine, di-n-propylamine, di-n-butylamine, di-n-pentylamine, di-n-hexylamine, diisopropylamine, N-methyl-n-stearylamine, di-n-stearylamine, cyclohexylamine, piperidine, pyrrolidone and morpholine. Relatively high molecular weight compounds which have a primary or secondary amino group and are otherwise isocyanate inert may in principle also be used in process step (ii) although they are less preferred than the above-mentioned simple monoamines. Aromatic primary and secondary mono-functional amines are also suitable but less preferred.

When such monoamines are used, mixtures of water-dilutable binder components are formed in the process according to the invention. These mixtures may be used, for example, as reactive components for organic polyisocyanates. When readily volatile monoamines are used, they constitute blocking agents comparable to the compounds mentioned below so that the mixtures finally obtained may also be used in or as stoving lacquers from which the monoamines are split off as blocking agents during the curing process and evaporate.

Another group of compounds containing isocyanate reactive groups suitable for process step (ii) are monofunctional blocking agents such as, in particular, oximes, preferably (cyclo)aliphatic ketoximes having 3 to 6 carbon atoms such as acetone, butanone or cyclohexanone oxime. When such compounds are used, the process according to the invention results in water-dilutable binder mixtures which may be used as stoving lacquers or for the preparation of such lacquers.

Another group of compounds which may be used in process step (ii) are the amino alcohols which are considered to be "monofunctional in isocyanate addition reactions" due to the extreme difference in reactivity between the amino groups and the hydroxyl groups, especially when they are used in quantities providing at least one amino group for each isocyanate group. Examples of such amino alcohols are those containing 2 to 8 carbon atoms, such as 2-aminoethanol, 2-(methylamino)-ethanol, diethanolamine, 3-amino-l-propanol, 1-amino-2-propanol, diisopropanolamine, 2-amino-2-methyl-propanol, 2-amino-2-methyl-1,3-propanediol, 2-amino-2-hydroxymethyl-1,3-propanediol, dibutanolamine and mixtures thereof. Relatively high molecular weight compounds containing a primary or secondary amino group and in addition one or more alcoholic hydroxyl groups may also be used but are less preferred.

When such amino alcohols are used, the end products are mixtures of water dilutable polyhydroxyl compounds which may used again, for example, as polyol components in two-component polyurethane coating compositions.

The compounds with isocyanate reactive groups used in process step (ii) may also be compounds containing a carboxylate or sulphonate group in addition to a highly isocyanate reactive group. Examples of such compounds include in particular the alkali metal salts of amino-carboxylic acids or aminosulphonic acids. The use of such compounds may in special cases result in improved dispersibility in water of the worked up binder mixtures.

Mixtures of the above mentioned compounds and optionally other compounds which have a higher isocyanate reactivity than water and the reactive component used in the two-component polyurethane coating composition are also suitable.

Particularly preferred compounds containing isocyanate reactive groups which may be used in process step (ii) are the water-soluble, secondary monoamines, oximes and amino alcohols.

If the compound containing isocyanate reactive groups used in process step (ii) is insoluble in water, it may be converted into a water-soluble or dispersible form by means of the known anionic, cationic or nonionic emulsifiers. Suitable emulsifiers include both non-ionic and anionic surfactants, e.g.

1. alkyl sulphates, especially those having a chain length of 8 to 18 carbon atoms, alkyl and alkylarylether sulphates having 8 to 18 carbon atoms in the hydrophobic radical and 1 to 40 ethylene oxide or propylene oxide units,
2. sulphonates, especially alkyl sulphonates having 8 to 18 carbon atoms, alkylaryl sulphonates having 8 to 18 carbon atoms, taurides, esters and semi-esters of sulphosuccinic acid with monohydric alcohols or alkylphenols having 4 to 15 carbon atoms in the alkyl radical; these alcohols or alkylphenols may also be ethoxylated with 1 to 40 ethylene oxide (EO) units,
3. phosphoric acid partial esters and their alkali metal and ammonium salts, especially alkyl and alkylaryl phosphonates having 8 to 20 carbon atoms in the organic radical, alkyl ether and alkyl arylether phosphates having 8 to 20 carbon atoms in the alkyl or alkylaryl radical and 1 to 40 EO units,
4. alkyl polyglycol ethers preferably having 8 to 40 EO units and alkyl radicals having 8 to 20 carbon atoms,
5. alkylaryl polyglycol ethers preferably having 8 to 40 EO units and 8 to 20 carbon atoms in the alkyl and aryl radicals,
6. ethylene oxide/propylene oxide (EO/PO) block copolymers preferably have 8 to 40 EO units and/or
7. ammonium amphiphiles having a chain length of 4 to 15 carbon atoms in the alkyl radicals and mixtures of these and/or other emulsifiers or surface active substances.

In all variations of the process according to the invention, the compounds which are highly isocyanate reactive as described above are used in quantities corresponding to an equivalent ratio of groups which are highly isocyanate reactive in accordance with the above definitions to isocyanate groups in the overspray of from 0.5:1 to 50:1, preferably from 0.9:1 to 10:1 and in particular from 0.9:1 to 2:1.

In a preferred embodiment of the process according to the invention, the compound containing highly isocyanate reactive groups is dissolved or emulsified in the water of coating plants which are equipped with means for washing overspray with water. The overspray reacts with the compound and remains dissolved or emulsified in the water of the coating plant. The consumption of the compound containing isocyanate reactive groups can be continuously or intermittently offset by the addition of further quantities. As soon as the water of the coating plant has a solids content of from 0.5 to 25% by weight, preferably 1 to 10% by weight, the overspray is concentrated by conventional methods such as ultra-filtration or low pressure evaporation to a viscosity of from 50 to 20,000 mPa.s, preferably from 10 to 5000 mPa.s at 23° C. The water obtained from this procedure may be returned to the coating plant.

In a less preferred embodiment, the compound containing highly isocyanate reactive groups is not dissolved in the water of the coating plant. The reaction with the isocyanate groups of the overspray takes place in a separate reaction vessel as soon as the water of the coating plant has a solids content of from 0.5 to 25% by weight, preferably from 1 to 10% by weight. The time between preparation of the coating compositions and the reaction of the isocyanate groups of the overspray with highly isocyanate reactive compound must not exceed 2 to 48 hours, preferably 2 to 10 hours, depending upon the reactivity of the two-component polyurethane coating composition used.

In coating plants equipped with discs or bands, the overspray on the discs or bands is continuously stripped off, if necessary with water to wet the overspray, and is then collected in receivers. These receivers contain a 0.001 to 10% aqueous solution or emulsion of the compound containing isocyanate reactive groups. Working up to a water dilutable coating composition is again carried out by concentration as described above or by dilution with water if the viscosities are too high.

The resulting aqueous solutions or dispersions of the chemically modified overspray may be used again as two-component polyurethane coating compositions, e.g., in combination with fresh lacquer polyisocyanates, or they may be mixed with other water dilutable polyhydroxyl compounds and/or additives and used as the polyhydroxyl component in two-component polyurethane coating compositions. Any constituents lost during the process of working up, e.g., amines for regulating the pH, may be replaced. The coating compositions are suitable for the same uses as the original binders.

If the compounds containing isocyanate reactive groups used in process step (ii) are compounds which are split off again at elevated temperatures, such as secondary amines or oximes, the worked up chemically modified overspray may be reused as a binder for stoving lacquers.

Amino cross-linking resins and/or blocked polyisocyanates may be added to the worked up, chemically modified overspray and the overspray may be used as a binder for stoving coating(s).

The overspray may also be used as a physically drying coating composition, but this is less preferred.

All pads and percentages in the following examples are by weight, unless otherwise indicated.

EXAMPLES

Starting materials:
Polyol 1:
An aqueous dispersion of a polyacrylate resin prepared by free radical polymerization according to DE-OS 3,829,587 (U.S. Pat. No. 5,075,370) from 459 parts of hydroxyethyl methacrylate, 231 parts of methyl methacrylate, 600 pads of n-butylacrylate and 150 pads of acrylic acid, and neutralized with ammonia. The dispersion had an OH content of 1.1% at a solids content of 26%.
Polyol 2:
An aqueous dispersion of a polyester polyol prepared by polycondensation according to DE-OS 4,137,429 (copending U.S. application, Ser. No. 07/973,368) from 152 pads of hexanediol, 130 pads of neopentyl glycol, 50 parts of cyclohexane dimethanol, 164 pads of trimethylolpropane, 279 pads of phthalic acid anhydride, 225 pads of hexahydrophthalic acid anhydride and 107 pads of tetrahydrophthalic acid anhydride, and neutralized with triethylamine. The dispersion had an OH content of 3.5% at a solids content of 38%.
Polyisocyanate 1:

An isocyanurate group-containing polyisocyanate based on hexamethylene diisocyanate according to DE-OS 4,136, 618 (U.S. Pat. No. 5,252,696, herein incorporated by reference) and modified with a polyethylene oxide polyether having an average molecular weight of 350. The water dilutable polyisocyanate had an isocyanate content of 17.3%, an ethylene oxide content of 11.3% and a viscosity at 23° C. of 3050 mPa.s.

Polyisocyanate 2:

An isocyanurate and uretdione group-containing polyisocyanate containing a mixture of 70 pads by weight of dimerized hexamethylene diisocyanate containing two terminal, free isocyanate groups and 30 pads by weight of trimerized hexamethylene diisocyanate [N,N',N"-tris-(6-isocyanatohexyl)-isocyanurate] mixed with minor quantities of higher homologs of both products. The polyisocyanate had an average viscosity of 200 mPa.s/23° C. and an average free isocyanate group content of 22.5%.

Example 1

1 kg of a coating composition was sprayed in a spray booth with water separation. The coating composition was a water-dilutable clear coating composition having a solids content of 30% in which the binder consisted of a combination of Polyisocyanate 1 with Polyol 1 in an NCO/OH ratio of 1.5:1.60 g of diisopropylamine were dissolved in the washing water before spraying. This corresponded to 1.1 times the equivalent quantity of amine, based on the isocyanate groups of the polyisocyanate.

After completion of the spraying process, the overspray diluted with water from the coating plant was reconcentrated to a solids content of 30% by means of a water jet vacuum at 60° C. The resulting aqueous dispersion was stable in storage for several months.

Polyisocyanate 1 was added to the dispersion in a quantity of 1.5 times the molar quantity of hydroxyl groups, and the dispersion was applied as a two-component polyurethane coating composition to a separate metal test sheet for each spray application. A clear, cross-linked, solvent resistant film was obtained after curing at room temperature.

Example 2

The procedure was the same as described in Example 1. The aqueous dispersion of the binder was applied as a 1-component polyurethane system and stoved for 30 minutes at 160° C. A clear, cross-linked, solvent resistant film was obtained.

Example 3

The procedure was the same as described Example 1, using the same quantity of the same coating composition. 30 g of diisopropylamine and 25 g of N-methylaminoethanol were dissolved in the washing water before spraying. Working up was carried out as in Example 1.

A quantity of Polyisocyanate 1 equivalent to the hydroxyl groups present was added to the recovered binder and the binder was applied to a test sheet. After curing at room temperature, a clear, cross-linked, solvent resistant film was obtained.

Example 4

The procedure was the same as in Example 1 except that an equivalent amount of Polyol 2 was used in place of Polyol 1.

The recovered binder obtained was applied as a one-component system and stoved at 160° C. for 30 minutes. A clear, cross-linked, solvent resistant film was obtained.

Example 5

The procedure was the same as described in Example 1 except that an equivalent amount of Polyisocyanate 2 was used in place of Polyisocyanate 1.30 g of diisopropylamine and 30 g of N-methyltaurine were dissolved in the washing water before spraying.

The polyisocyanate described above was added to the recovered binder in a quantity of 1.5 times the molar quantity of hydroxyl groups, and the binder was applied to a test sheet as a two-component polyurethane coating composition. After curing at room temperature, a clear, cross-linked, solvent resistant film was obtained.

Example 6

1 kg of the coating composition from Example 1 was sprayed in a spray booth in which a rotating disc was arranged behind the workpiece. The overspray was continuously stripped from the disc and introduced into a receiver. The receiver contained 60 g of diisopropylamine in 250 g of water.

After completion of the spraying process, the modified overspray was diluted with water to a solids content of 30%.

The recovered binder was applied as a one-component polyurethane system and stoved at 160° C. for 30 minutes. A clear, cross-linked, solvent resistant film was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for reusing the overspray obtained when spraying an aqueous two-component polyurethane coating composition containing a polyisocyanate and an aqueous solution or dispersion of a compound containing isocyanate reactive groups which comprises (i) collecting the overspray and optionally diluting it with water, (ii) simultaneously with or after step (i), reacting the overspray, optionally in the presence of an emulsifier, with a compound which is more reactive with isocyanate groups than both water and the compound containing isocyanate reactive groups and (iii) reusing the resulting aqueous solution or dispersion of the chemically modified overspray in a one- or two-component, chemically and/or physically drying coating composition, optionally after adjusting the spray viscosity of the coating composition to a suitable spray viscosity by either removing or adding water and optionally after the addition of additives.

2. The process of claim 1 wherein said compound which is more reactive with isocyanate groups comprises a primary or secondary monoamine containing an aliphatically bound amino group.

3. The process of claim 1 wherein said compound which is more reactive with isocyanate groups comprises an amino alcohol.

4. The process of claim 1 wherein said compound which is more reactive with isocyanate groups comprises an amine containing a carboxylate or sulphonate group.

5. The process of claim 1 wherein said compound which is more reactive with isocyanate groups comprises an oxime.

6. A process for reusing the overspray obtained when spraying an aqueous two-component polyurethane coating composition containing a polyisocyanate and an aqueous solution or dispersion of a compound containing isocyanate reactive groups which comprises (i) collecting the overspray and optionally diluting it with water, (ii) simultaneously with or after step (i), reacting the overspray, optionally in the presence of an emulsifier, with a compound which is more reactive with isocyanate groups than both water and the compound containing isocyanate reactive groups and (iii) reusing the resulting aqueous solution or dispersion of the chemically modified overspray as all or a portion of the polyhydroxyl component of an aqueous two-component polyurethane coating composition, optionally after adjusting the spray viscosity of the coating composition to a suitable spray viscosity by either removing or adding water and optionally after the addition of additives.

7. The process of claim 6 wherein said compound which is more reactive with isocyanate groups comprises a primary or secondary monoamine containing an aliphatically bound amino group.

8. The process of claim 6 wherein said compound which is more reactive with isocyanate groups comprises an amino alcohol.

9. The process of claim 6 wherein said compound which is more reactive with isocyanate groups comprises an amine containing a carboxylate or sulphonate group.

10. The process of claim 6 wherein said compound which is more reactive with isocyanate groups comprises an oxime.

11. A process for reusing the overspray obtained when spraying an aqueous two-component polyurethane coating composition containing a polyisocyanate and an aqueous solution or dispersion of a compound containing isocyanate reactive groups which comprises (i) collecting the overspray and optionally diluting it with water, (ii) simultaneously with or after step (i), reacting the overspray, optionally in the presence of an emulsifier, with a compound which is more reactive with isocyanate groups than both water and the compound containing isocyanate reactive groups and (iii) reusing the resulting aqueous solution or dispersion of the chemically modified overspray as all or a portion of the polyhydroxyl component of a heat crosslinkable, an aqueous one- or two-component polyurethane coating composition, optionally after adjusting the spray viscosity of the coating composition to a suitable spray viscosity by either removing or adding water and optionally after the addition of additives.

12. The process of claim 11 wherein said compound which is more reactive with isocyanate groups comprises a primary or secondary monoamine containing an aliphatically bound amino group.

13. The process of claim 11 wherein said compound which is more reactive with isocyanate groups comprises an amino alcohol.

14. The process of claim 11 wherein said compound which is more reactive with isocyanate groups comprises an amine containing a carboxylate or sulphonate group.

15. The process of claim 11 wherein said compound which is more reactive with isocyanate groups comprises an oxime.

* * * * *